United States Patent [19]

Babcock

[11] 4,048,859
[45] Sept. 20, 1977

[54] LASER ACCELEROMETER
[75] Inventor: Gary D. Babcock, Mission Viejo, Calif.
[73] Assignee: Rockwell International Corporation, El Segundo, Calif.
[21] Appl. No.: 621,725
[22] Filed: Oct. 14, 1975
[51] Int. Cl.² .................................. G01P 15/08
[52] U.S. Cl. .................................. 73/516 R
[58] Field of Search ............ 73/516 R, 517 R, 517 B; 331/94.5 M

[56] References Cited
U.S. PATENT DOCUMENTS

| | | | |
|---|---|---|---|
| 3,438,710 | 4/1969 | Quick et al. | 73/516 R |
| 3,622,912 | 11/1971 | Doyle et al. | 331/94.5 M |
| 3,786,681 | 1/1974 | Kiehn | 73/517 R |
| 3,800,594 | 4/1974 | Hutchings et al. | 73/517 R X |

Primary Examiner—James J. Gill
Attorney, Agent, or Firm—H. Fredrick Hamann; Rolf M. Pitts; Edward A. Sokolski

[57] ABSTRACT

An optical element formed of birefringent material is placed in the resonant optical beam path of a gas laser. A proof mass is fixedly attached to the birefringent element to form an integral unit therewith, this unit being contained within the same chamber as the lasing gas. Means are provided to subject the laser beam to a transverse magnetic field which effectively operates to keep the beam separated into E and O rays which are polarized in orthogonal relationship to each other. The proof mass is affixed to the birefringent element so that when such mass is subjected to an acceleration along a predetermined axis, the force arising from this acceleration will be transferred to the birefringent element, there being substantially no transfer of acceleration forces to this element along other axes. The index of refraction of the birefringent material changes in response to the acceleration input received thereby, the index of refraction change seen by each of the cross polarized beams being different. This results in a frequency difference between these two beams that is proportional to the acceleration input and is measured by a detector.

12 Claims, 9 Drawing Figures

LASER ACCELEROMETER

The invention herein described was made in the course of or under a contract or subcontract thereunder, with the Department of the Navy.

BACKGOUND OF THE INVENTION

This invention relates to laser accelerometers, and more particularly to such a device utilizing a sensing element of birefringent material which produces a frequency difference between cross polarized laser beam components in response to acceleration inputs.

Laser accelerometers are described in U.S. Pat. Nos. 3,517,560 and 3,800,594, both of these patents representing development work done at Rockwell International Corporation, the assignee of the present application. In such devices, a monochromatic source of light is separated into mutually orthogonally polarized beams generally known as extraordinary rays, E, and ordinary rays, O. Separation of the cross polarized beams into different oscillating systems is maintained by means of a transverse magnetic field. An acceleration sensor fabricated of an optically birefringent material is placed in the path of the laser beam. Birefringence (double refraction) is introduced into the material by virtue of a stress being placed thereon in response to an acceleration input along a predetermined axis, this stress being transferred to the material from a proof mass. This stress operates to change the index of refraction of the material by a first magnitude as seen by one of the beams, and a second magnitude as seen by the other of the beams. It can be shown that a phase difference, $\psi$ between the mutually orthogonally polarized E and O beams is developed in response to this stressing of the sensor, as follows:

$$\psi = \frac{2\pi \eta_{E-O} \cdot l}{\lambda} \quad (1)$$

where, $\eta_{E-O}$ = the difference in the index of refraction of the sensor along and perpendicular to the direction of stress $l$ = the thickness of the sensor material through which the rays pass, and $\lambda$ = wavelength of the laser beam. A frequency difference is thereby developed between the two beams which can be measured by an appropriate detector. In this manner, a digital signal having a frequency proportional to sensed acceleration is provided.

The laser accelerometer has distinct advantages over other types of accelerometers. First, it is inherently a digital device having a very fine output resolution and sensitivity. Further, it has no moving parts and involves a very simple structure which lends itself to low cost and high reliability as compared with other types of accelerometers. Also, because it employs no suspension system and utilizes displacements on the atomic level, it is feasible to have a laser accelerometer operate in acceleration environments ranging from a micro-g to over 500 g's. This type of device also inherently has extremely high sensitivity and stability.

In laser accelerometers of the prior art, the birefringent sensor has been placed outside of the lasing gas cavity, the cross polarized beams passing through a window in such cavity. Experiments have indicated that this window is thermally stress sensitive due to the expansion and contraction of the material used to bond the window to the mounting frame with changes in temperature. This results in significant index of refraction changes for variations in temperature which adversely affect the accuracy of the instrument. Also, devices of the prior art utilize mounting structures between the proof mass and the sensor which require extreme precision in their relationships and tend to result in instability with time. Further, slight mounting misadjustments of the proof mass and sensor can cause "offset" bias effects as well as high cross axis acceleration sensitivity.

The device of the present invention obviates the aforementioned shortcomings first by incorporating the sensor-proof mass assembly within the lasting gas cavity so that no window is required in the resonant optical path. Further, by mounting the sensor within the laser cavity which is a partial vacuum environment, differential pressure effects are minimized. Further, in the device of the invention, the proof mass and sensor are joined together to form an integral unit wherein mounting problems between these two elements which have been encountered in the prior art are minimized.

SUMMARY OF THE INVENTION

An acceleration sensor is formed by an optical element of birefringent material placed in the resonant optical beam path of a gas laser. A proof mass is fixedly attached to the birefringent element to form an integral unit therewith, this attachment being such that only acceleration inputs along a single predetermined axis are transferred to the birefringent element. In the preferred embodiment this is achieved by means of a web structure formed in the birefringent element to which the proof mass is attached, this web structure acting as a flexure or diaphragm support for the proof mass insofar as acceleration components along the acceleration sensitive axis and as a rigid support for accelerations normal to this axis. The integral proof mass-sensor unit is continaed within the same chamber as the lasing gas so as to obviate the need for a window in the resonant optical path. Means are provided to subject the laser beam to a transverse magnetic field which effectively operates to keep the beam separated into E and O components which are polarized in mutually orthogonal relationship. When an acceleration input is received along the sensing axis, the birefringent material is stressed so as to change the index of refraction thereof in proportion to acceleration input. The index of refraction change seen by each of the crossed polarized beams is different, resulting in a frequency difference therebetween. A heterodyne signal is developed between these two beams by placing a plane polarizer at an angle of 45° to both polarizations. The resulting difference frequency beam is detected by a suitable photodetector.

Figure 1:
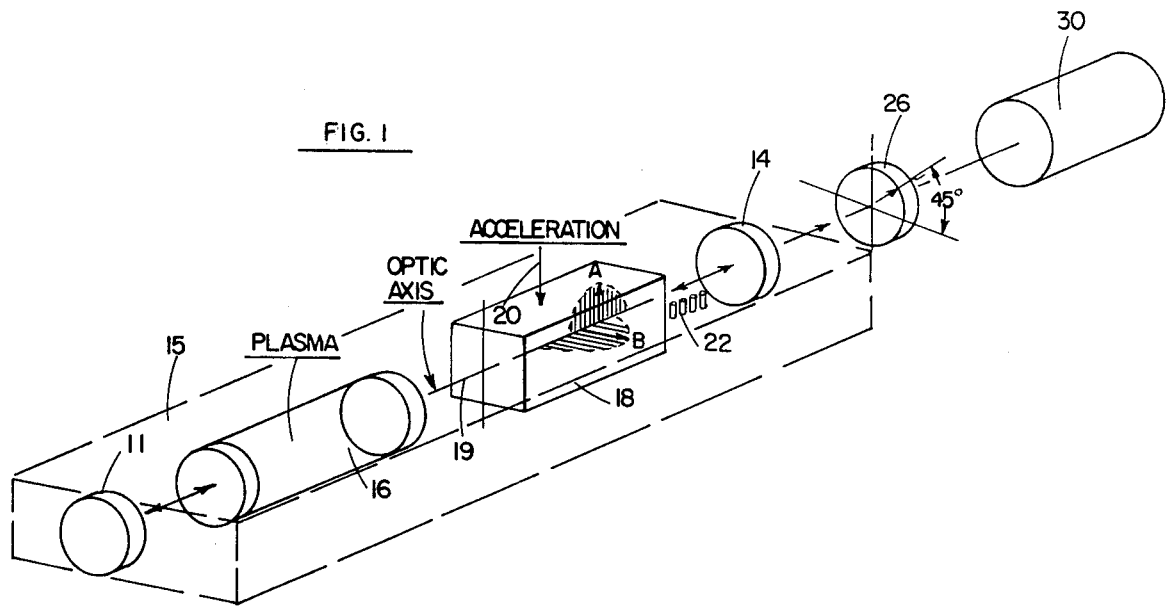
FIG. 1 is a schematic drawing illustrating the invention.
Figure 2:
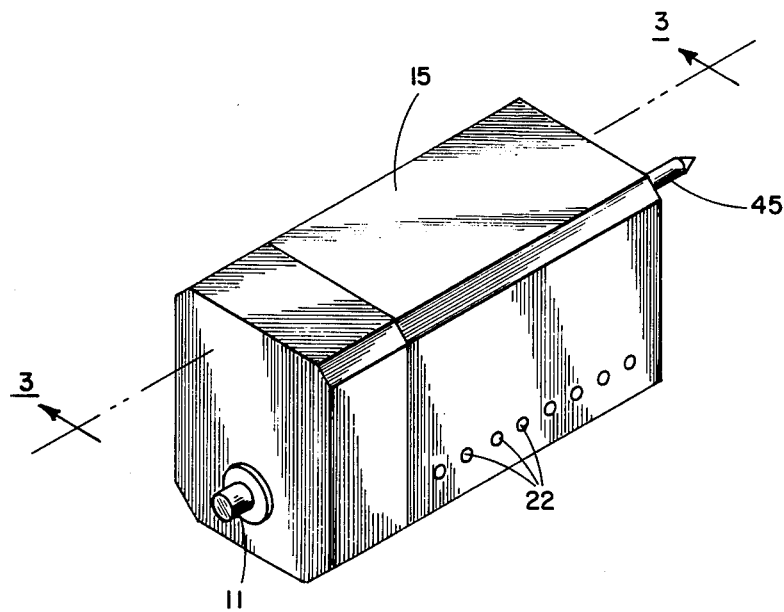
FIG. 2 is a perspective view of a preferred embodiment of the invention.
Figure 3:
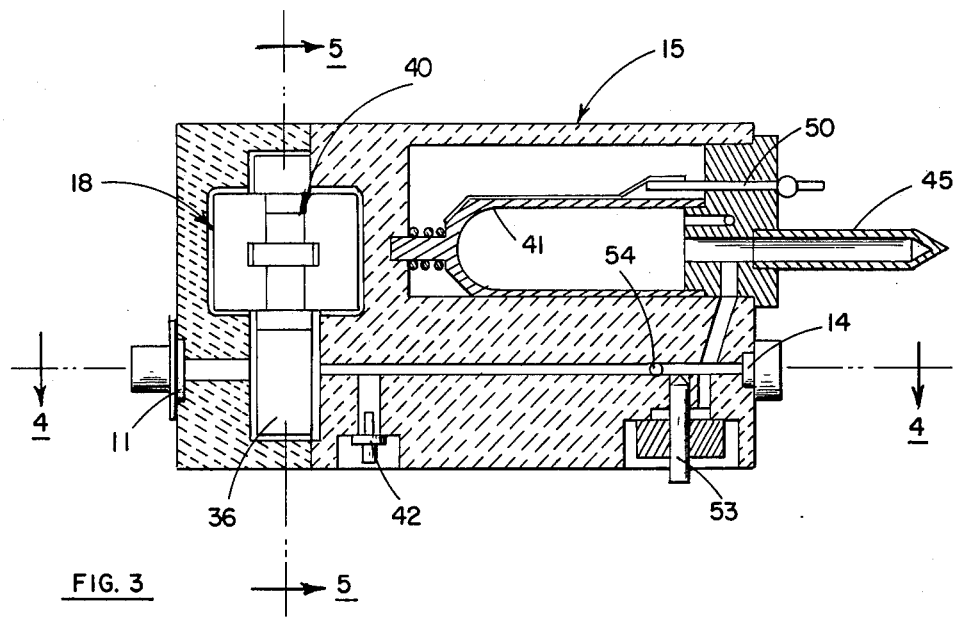
FIG. 3 is a cross-sectional view taken along the plane indicated by 3—3 in FIG. 2.
Figure 4:
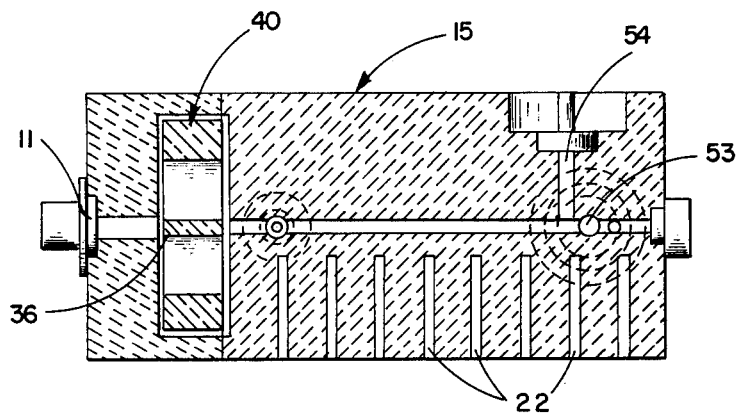
FIG. 4 is a cross-sectional view taken along the plane indicated by 4—4 in FIG. 3.
Figure 5:
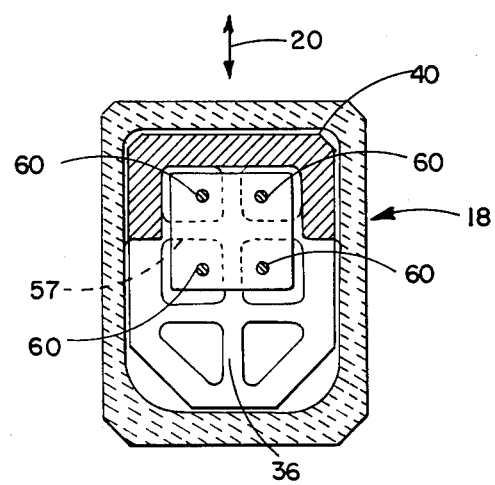
FIG. 5 is a cross-sectional view taken along the plane indicated by 5—5 in FIG. 3.
Figure 6:
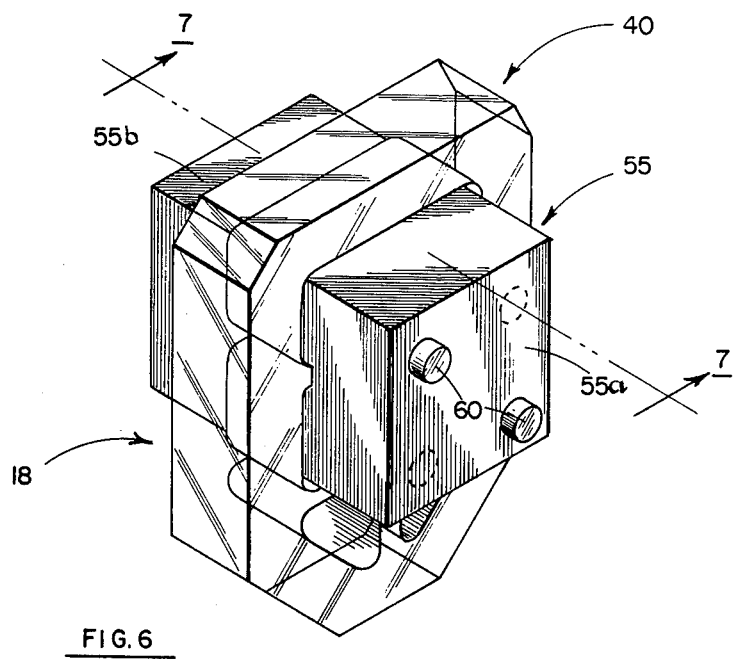
FIG. 6 is a perspective view illustrating the proof mass-sensor unit.
Figure 7:
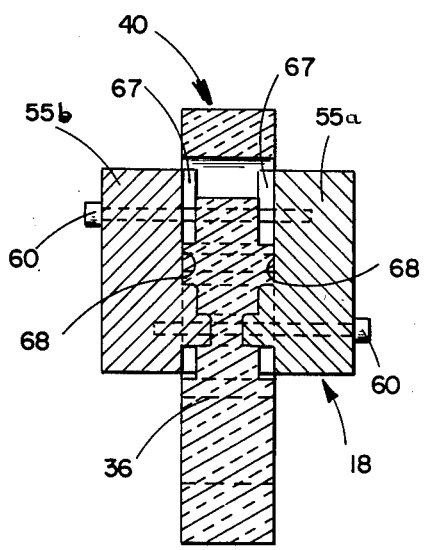
FIG. 7 is a cross-sectional view taken along the plane indicated by 7—7 in FIG. 6.
Figure 8:
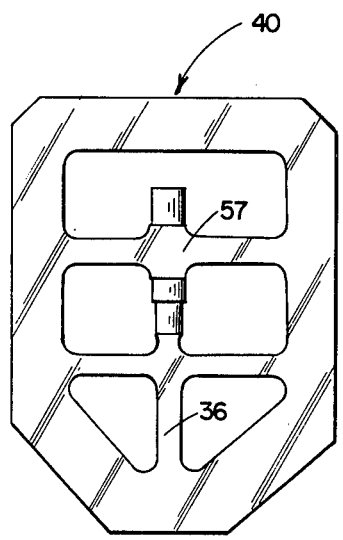
FIG. 8 is an elevational plane view of the sensor element.

Referring now to FIG. 1, the invention is schematically illustrated. A resonant laser cavity is formed between a highly reflective mirror 11 and a partially reflective mirror 14 within a sealed chamber 15. A lasing gas is contained within chamber 15 and is indicated schematically by plasma 16. A proof mass-sensor unit 18 is mounted in chamber 15, this unit comprising a proof mass which is integrally fabricated with a birefringent optical sensor element. A portion of the sensor element is located along optic axis 19 such that the laser beam passes therethrough. When unit 18 is subjected to an acceleration input along axis 20, the birefringent sensor element is stressed in response to this acceleration which results in a change in the index of refraction of the sensor which differs with direction in the material. The laser beam is separated into mutually orthogonally polarized beams indicated by arrows "A" and "B". The separation between these crosspolarized beams is maintained by means of the transverse magnetic field provided by permanent magnets 22. For any given acceleration input along axis 20, and a resultant change in the index of refraction of the sensor, a particular frequency difference will result between the cross-polarized beams. The two beams are combined for heterodyning by passing them through a plane polarizer 26 which is located outside cavity 15, this polarizer being placed at an angle of 45° to the two polarizations. The resulting beam output of polarizer 26 is passed to photodetector 30 which produces an output in accordance with the difference in frequency there-between, this difference frequency being in accordance with the acceleration input.

DESCRIPTION OF THE PREFFERED EMBODIMENT

Referring now to FIGS. 2–8, a preferred embodiment of the invention is illustrated. All of the components of the device except for the polarizer and detector are contained within housing 15 which forms a sealed container for the laser gas, the birefringent sensor being contained in this sealed cavity. Housing 15 may be fabricated of an ultra-low-expansion material such as titanium silicate glass. A resonant optical laser cavity is formed between highly reflective flat mirror 11 and partially reflective spherical mirror 14. The laser beam formed in this optical cavity passes through narrow web portion 36 of of birefringent sensor element 40. The opposite surfaces of web portion 36 through which the beam passes have "hard" anti-reflection films deposited thereon which are capable of withstanding continual plasma bombardment without degradation.

Excitation for the lasing gas is provided by means of the glow discharge between cold cathode 41 and anode 42. Cathode 41 may be frabricated from an aluminum alloy, the surface of which has been appropriately oxidized. The cavity may be filled with lasing gas through fill stem 45. Permanent pin magnets 22 are mounted along the laser cavity to provide a transverse magnetic field to keep the mutually orthogonally polarized beams separated from each other. A getter 50 may be provided to enhance laser lifetime. To enable adjustment so as to insure operation in the $TEM_{OO}$ mode, two adjustable aperture units 53 and 54 are provided.

Referring now particularly to FIGS. 5–8, let us now examine the structural details of the proof mass-sensor unit 18 of the preferred embodiment. Sensor element 40 is fabricated of a birefringent material such as fused silica. Commercially available fused silica which has been found suitable is Suprasil available from Amersil, Inc., Los Angeles. Other commercially available fused silicas which may be used include Ultrasil and Dynasil available from Dynasil Corp. of America, Berlin, N.J. Proof mass 55 is formed in two identical sections 55a and 55b which are fixedly attached to each other and to sensor element 40 by means of bolts 60. Proof mass 55 preferably is additionally cemented to the sensor. The proof mass is attached to a web structure portion 57 of the sensor which is in the shape of a cross, the proof mass portions having slots 67 and 68 formed therein which are fitted over web structure 57 in mating relationship. The proof mass 55 is thus firmly joined to the birefringent sensor solely at web portion 57 and does not contact other portions of the sensor. Proof mass 55 may be fabricated of a suitable metallic material such as Mallory 1000. Web portion 57 forms a flexure or diaphragm support for the proof mass insofar as acceleration inputs along the sensing axis 20 (see FIG. 5). This makes for high sensitivity to acceleration inputs along axis 20 but low sensitivity for acceleration components normal to this axis. Sensor 40 has a second web portion 36 through which, as already noted, the laser beam passes. This web portion is made relatively narrow so that for any given acceleration input, it will be subjected to a relatively high force per unit area to made for high sensitivity.

Figure 9:
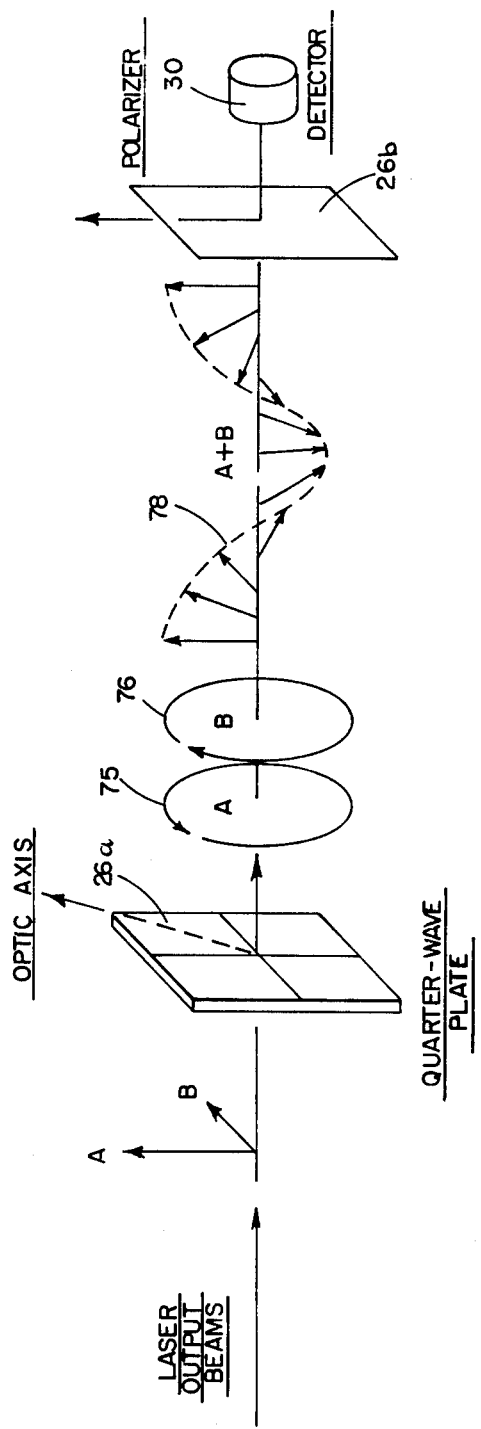
FIG. 9 is a schematic drawing illustrating how detection may be accomplished in the device of the invention.

Referring now to FIG. 9 the detection of the difference frequency in the device of the invention is schematically illustrated. Such heterodyne detection, as generally described in connection with FIG. 1, is achieved by means of a quarter-wave plate 26a and polarizer 26b operating in conjunction with a photodetector 30. A suitable linear polarizer with a quarter-wave plate attached which may be used for elements 26a and 26b is commercially available form Polaroid Company. Operation is as follows: The two cross-polarized beams, A and B, pass through quarter-wave plate 26a and are converted to a pair of counter-rotating circularly polarized beams 75 and 76. The sum of beams 75 and 76 may be described as a plane wave whose plane of polarization is rotating at half the rate of the difference frequency, as illustrated at 78. Hence, when the beam is passes through plane polarizer 26b, the resulting output wave in effect blinks on and off at the difference frequency, i.e., every time the plane of polarization aligns with the polarizer, it is transmitted therethrough. This occurs twice per revolution. The phase of the output wave must be determined in order to detect the direction of acceleration. It can be seen that a second polarizer set at an angle of 45° to linear polarizer 26b will transmit a wave with a 90° phase difference to the first. The sense of the rotation of the output wave can be determined by detecting this signal with a quadrature detection technique. When the acceleration is plus, the plane wave is rotating in one direction and the signal from the first detector will lead the second, and conversely, when the acceleration is negative, the plane wave is rotating in the other direction and the signal from the first detector will lag the second.

While the invention has been described and illustrated in detail, it is to be clearly understood that this is intended by way of illustration and example only and is not to be taken by way of limitation, the spirit and scope of the invention being limited only by the terms of the following claims.

I claim:

1. A laser accelerometer comprising:
   a windowless chamber, means for forming a resonant optical laser beam in said chamber,
   a webbed birefringent sensor element mounted in said chamber, said beam passing through said element,
   a proof mass integral with said sensor element, a first web portion of said sensor element providing a substantially flexural support for the proof mass along a predetermined acceleration sensing axis and a second web portion thereof perpendicular to said first web portion providing substantially rigid support along axes normal to said predetermined axes,
   means for subjecting said laser beam to a transverse magnetic field to keep the beam separated into orthogonally polarized components,
   means for combining said orthogonally related components for heterodyning, and
   detector means for detecting the difference frequency between the heterodyned components,
   whereby a difference frequency is developed between said components proportional to the magnitude of the acceleration of said proof mass along said predetermined sensing axis.

2. The device of claim 1 wherein said laser is a gas laser, said chamber containing the laser gas.

3. The device of claim 1 the proof mass is joined only to the webbed portion of the sensor element.

4. A laser accelerometer comprising:
   a chamber,
   means for forming a resonant optical laser beam in said chamber,
   a birefringent sensor element mounted in said chamber, said beam passing through said element,
   a proof mass integral with said sensor element, said sensor element providing a substantially flexural support for the proof mass along a predetermined acceleration sensing axis and a substantially rigid support along axes normal to said predetermined axes,
   means for subjecting said laser beam to a transverse magnetic field to keep the beam separated into orthogonally polarized components,
   means for combining said orthogonally related components for heterodyning, and
   detector means for detecting the difference frequency between the heterodyned components,
   whereby a difference frequency is developed between said components proportional to the magnitude of the acceleration of said proof mass along said predetermined sensing axis,
   said sensor element having a web portion, the proof mass being joined only to the web portion of the sensor element,
   the web portion being in the form of a cross, the proof mass having slots formed therein which matingly engage the arms of said cross.

5. The device of claim 4 wherein said sensor element has a second web portion, the laser beam passing through said second web portion.

6. The device of claim 5 wherein the surface portions of the second web portion are coated with an antireflection hard film capable of withstanding plasma bombardment.

7. The device of claim 4 wherein said proof mass comprises two similar portions joined to each other and to opposite sides of said sensor element.

8. The device of claim 4 wherein said means for subjecting the laser beam to a transverse magnetic field comprises a plurality of pin magnets mounted along the path of said laser beam.

9. The device of claim 4 wherein said sensor element is fabricated of fused silica.

10. The device of claim 9 wherein said sensor element is fabricated of Suprasil.

11. The device of claim 4 wherein said housing is fabricated of an ultra-low-expansion material.

12. The device of claim 4 wherein said means for combining said orthogonally polarized components comprises a quarter-wave plate and plane polarizer.

* * * * *